United States Patent [19]

Marks et al.

[11] Patent Number: 5,039,828
[45] Date of Patent: Aug. 13, 1991

[54] WIRE HARNESS PROTECTOR AND PIVOTABLE DOOR ASSEMBLY INCLUDING SAME

[75] Inventors: Larry D. Marks, St. Joseph Township; Raymond W. Spiegel, Lincoln Township, both of Berrien County, Mich.; Delbert M. Halling, Rutherford County, Tenn.

[73] Assignee: Whirlpool Corporation, Benton Harbor, Mich.

[21] Appl. No.: 410,255

[22] Filed: Sep. 21, 1989

[51] Int. Cl.⁵ .................... H02G 3/04; B08B 13/00
[52] U.S. Cl. ........................ 174/135; 49/167; 134/201; 174/72 A; 174/86; 174/101
[58] Field of Search .............. 174/72 A, 86, 101, 135, 174/DIG. 9; 49/167; 134/57 D, 57 DL, 58 D, 58 DL, 201; 312/223; 439/31, 165

[56] References Cited

U.S. PATENT DOCUMENTS

| | | | |
|---|---|---|---|
| 2,665,414 | 1/1954 | Hubacker et al. | 439/31 |
| 3,053,564 | 9/1962 | Evans et al. | 439/31 X |
| 3,848,361 | 11/1974 | Foster et al. | 49/167 |
| 3,883,201 | 5/1975 | Busoni | 312/223 |
| 4,140,357 | 2/1979 | Wolz et al. | 439/31 |
| 4,445,299 | 5/1984 | Lehikoinen et al. | 49/167 |
| 4,864,082 | 9/1989 | Ono et al. | 174/101 X |
| 4,891,471 | 1/1990 | Ono et al. | 174/101 X |
| 4,951,716 | 8/1990 | Tsunoda et al. | 174/101 X |

*Primary Examiner*—Laramie E. Askin
*Attorney, Agent, or Firm*—Jeffers, Hoffman & Niewyk

[57] ABSTRACT

A wire harness protector for use in an appliance. The wire harness protector consists of two members. A first member is secured to the door so as to pivot therewith. A second member is also secured to the door but remains stationary when the door is pivoted. Thus, when the door is pivoted, the second member is fixed relative to the door support structure and the first member pivots with the door. Both the first member and the second member include conduits which are aligned with the hinge axis of the door. Each of the first and second members forms an enclosure for enclosing and routing the wire harness. The conduits are formed by U-shaped channels and covers therefor. The covers are held in place by means of locking snaps. The entire first and second members may each be formed in a single integral molding process from a thermoplastic material such as a fire retardant polypropylene. In an alternative embodiment, the first member may be formed of a shallow U-shaped channel and the wire harness may be secured inside the channel by means of adhesive tape so that the wires are secured in predetermined positions within the U-shaped channel.

30 Claims, 3 Drawing Sheets

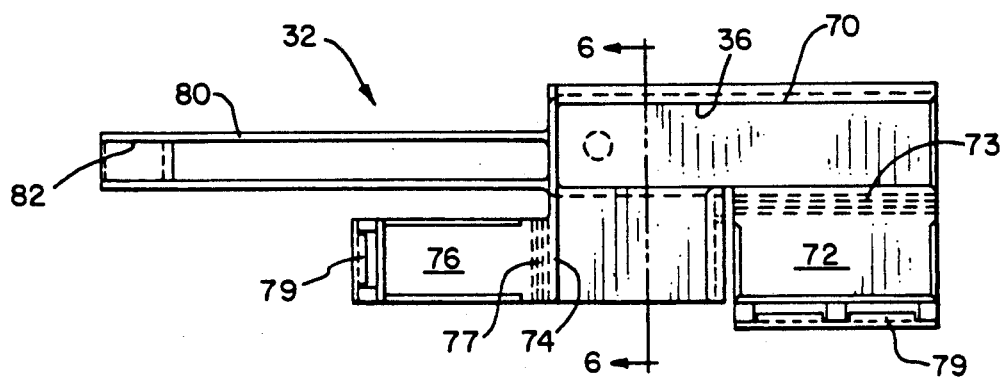
FIG. 5
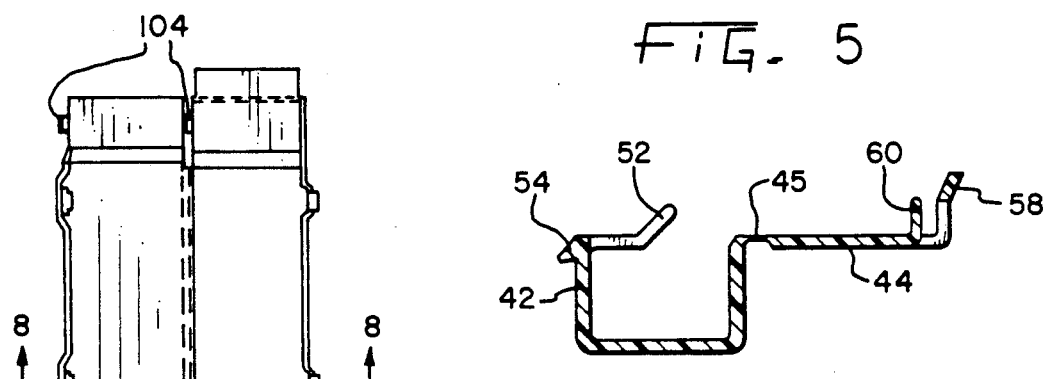
FIG. 4
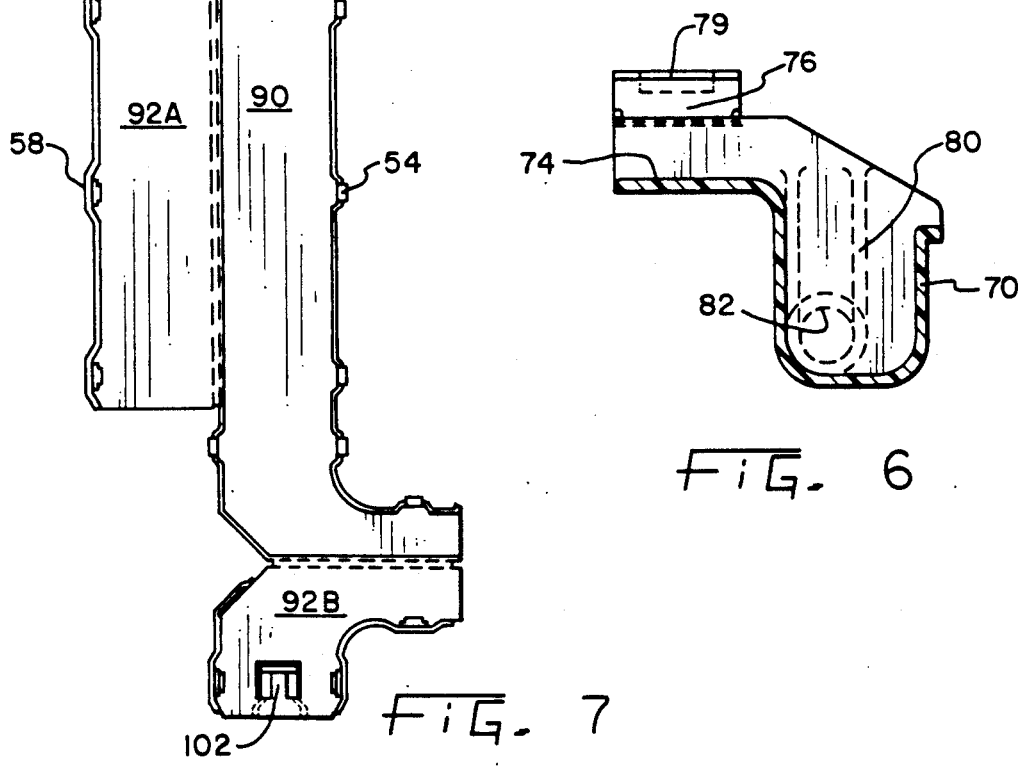
FIG. 6
FIG. 7

WIRE HARNESS PROTECTOR AND PIVOTABLE DOOR ASSEMBLY INCLUDING SAME

BACKGROUND OF THE INVENTION

This invention relates to wire harness protectors, and more particularly to a wire harness protector for routing a wire harness through the door of an appliance, past the door hinge and into the appliance cabinet Many electrically operated appliances, for instance residential dishwashers, have hollow doors within which are mounted various electrical controls, dispensers and other electrical devices. These electrical components are connected by electrical wires to a source of electric power and to other electrical components which are mounted in the dishwasher cabinet. Conventionally, the connecting wires are preassembled into a wire harness which is then installed during assembly of the appliance. In a wire harness, the wires are conventionally taped together to form a wire bundle with electrical tape or the like. The wire bundle is routed through the appliance door and is held in place and secured to the door by means of tie-down straps or the like.

Due to this type of assembly, Underwriters Laboratories (UL) requires the use of certain approved materials for constructing the appliance door. It is therefore desired to provide a protector for enclosing a wire harness in the door of the appliance to enable the use of less expensive materials for constructing an appliance door.

A wire harness must also be routed past the hinge of the appliance door. The portion of the wire harness which is secured to the door must pivot with respect to the portion of the wire harness which is stationary and secured to the appliance cabinet. Conventionally, two methods have been used for routing the wire harness past the door hinge. In the first method of construction, the wire harness crosses the hinge axis of the door substantially perpendicularly. Thus, the wires which make up the wire harness bundle must flex transaxially, i.e., the wires must bend or flex at right angles to their longitudinal axes. This places strain on the wires and thus may result in metal fatigue of the wires and in breakage thereof and the potential resultant failure of the appliance.

A second arrangement which has been used for routing the wire harness past the door hinge is to route the wire harness in such a way that the wires will twist or flex torsionally as the door is opened. To accomplish this, a portion of the wire harness is routed parallel to the hinge axis so that this parallel portion will twist and flex torsionally as the door is opened. The prior art arrangements have generally used tubular enclosures to route the wire harness parallel to the door hinge. Such arrangements have been relatively expensive to manufacture. Furthermore, in the assembly of such arrangements, the wire harness must be threaded through the tubular enclosure during the construction or installation of the wire harness. This procedure adds considerably to the labor cost.

It is therefore desired to provide a wire harness protector to both enclose and route the wire harness through the door of an appliance and to route the wire harness past the hinge of the appliance door so that the wires will flex torsionally as the door is pivoted. Furthermore, it is desired to provide such a wire harness protector which is easily installed and into which the wire harness is easily assembled.

SUMMARY OF THE INVENTION

The present invention overcomes the disadvantages of the prior art by providing a wire harness protector for routing a wire harness past the hinge of a door which can be assembled to the wire harness without having to thread the wire harness therethrough.

The wire harness protector of the present invention comprises a conduit assembly for fully enclosing the wire harness in the door of the appliance. The conduit assembly is shaped so that it has portions thereof aligned with the hinge axis of the door to ensure torsional flexing of the wires as the door is pivoted. The conduit assembly has another portion which encloses and routes the wire harness through the door.

The wire harness protector according to the present invention, in one form thereof, comprises a first enclosure formed by an elongated L-shaped channel with a hingeable cover therefor. The cover is hingedly connected to the channel by an elongated hinge. Locking means is provided to lock the cover into place on the channel. The entire channel, cover, and hinge may be integrally formed of a thermoplastic material. The first enclosure may be secured inside a hollow door of an appliance or the like with one leg of the L-shaped channel extending along the hinge axis of the door and defining a first conduit. A second enclosure is secured to the door or the stationary door support structure and includes a second conduit that is axially aligned with the hinge axis and forms a continuation of the first conduit and a third conduit which extends at an angle to the second conduit. The second enclosure also includes a channel and a hinged cover member to form the second conduit therebetween.

One advantage of the wire harness protector according to the present invention is that the harness protector completely surrounds and encloses the wire harness within the dishwasher door. By constructing the wire harness protector of approved material, such as a fire retardant polypropylene, it allows for construction of the appliance door of other, less expensive, materials such as, for instance, an inexpensive plastic material.

Another advantage of the wire harness protector according to the present invention is that it reduces tension and stress on the wire harness as the door is opened and closed by assuring that primarily torsional flexing of the wire harness occurs as the door is opened and closed. Thus, it reduces the potential of broken harness wires and the attendant failure of the appliance.

Yet another advantage of the wire harness protector according to the present invention is that it eliminates the need for using protective harness tape on the section of wire harness which is enclosed in the wire harness protector. Furthermore, by constructing the wire harness protector components as channels with hinged covers, assembly of the wire harness into the wire harness protector is very simple and therefore relatively inexpensive.

The present invention, in one form thereof, comprises a wire harness protector for use in an appliance which has a door support structure and a substantially hollow door. The hollow door is pivotally mounted to the door support structure for pivoting about a hinge axis. The wire harness protector is used to route electrical wires from the door support structure through the hollow door. The wire harness protector comprises a first member having a first conduit formed therein. The first member is adapted to be attached to the door with the first conduit thereof arranged parallel to, or preferably along, the hinge axis. A second member which is adapted to be secured in the hollow door is mounted to remain stationary when the door is moved. The second member includes a second conduit which is adapted to be disposed substantially in axial alignment with the first conduit for communication therewith when the second member is attached in the door. The second member also includes a third conduit formed therein which is interconnected with the second conduit and which communicates therewith. The third conduit is disposed at an angle to the second conduit.

The present invention, in one form thereof, comprises a wire harness protector for use in a dishwasher to route electrical wires from the door support structure of the dishwasher to a hollow dishwasher door. The door is pivotably mounted to the door support structure for pivoting about a hinge axis. The wire harness protector includes a first member and a second member. The first member has a first conduit formed therein The first member is adapted to be attached to the door with the first conduit disposed substantially parallel to or aligned with the hinge axis when the door is interconnected with the support structure and the wires are installed. The second member is adapted to be secured in the hollow door in a generally fixed position with respect to the door support structure. The second member includes a second conduit adapted to be disposed substantially in axial alignment with the first conduit for communication therewith when the second member is secured in the door. The second member also includes a third conduit which is rigidly connected to the second conduit and communicates therewith. The third conduit is disposed substantially perpendicularly to the second conduit.

The present invention, in one form thereof, comprises a pivotable door assembly for a dishwasher. The dishwasher includes a door support structure and a door assembly. The door assembly is adapted to be pivotably mounted to the door support structure for pivoting movement about a hinge axis. The door assembly comprises a door, a first wire harness member and a second wire harness member. The first wire harness member is secured to the door so as to move therewith and includes a first conduit arranged substantially parallel to the door hinge axis. The second wire harness member is fixedly secured to the door so as to remain stationary when the door is moved. The second wire harness member includes a second conduit disposed substantially in axial alignment and communicating with the first conduit. The second wire harness member also includes a third conduit which communicates with the second conduit and is disposed generally perpendicularly to the second conduit.

It is an object of the present invention to provide a wire harness protector which completely encloses a portion of the wire harness which is routed through the door of an appliance.

It is another object of the present invention to provide such a wire harness protector which ensures primarily torsional flexing of the wire harness as the appliance door is pivoted about its axis.

A still further object of the present invention is to provide a wire harness protector which includes a hingeable cover member whereby the wire harness is simple to install in the wire harness protector.

It is yet another object of the present invention to provide a wire harness protector which may be mounted to a door assembly for inexpensive subsequent mounting of the door assembly to a door support structure.

BRIEF DESCRIPTION OF THE DRAWINGS

The above mentioned and other features and objects of this invention and manner of attaining them will become more apparent and the invention itself will be better understood by reference to the following description of an embodiment of the invention taken in conjunction with the accompanying drawings wherein:

FIG. 4 is a cross sectional view of the member of FIG. 3 taken along line 4—4 thereof;

FIG. 5 is a top plan view of the second member of the wire harness protector according to the present invention with its cover members in their open positions;

FIG. 6 is a cross-sectional view of the member of FIG. 5 taken along line 6—6 thereof;

FIG. 7 is a top plan view of another embodiment of the first member of the wire harness protector according to the present invention;

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
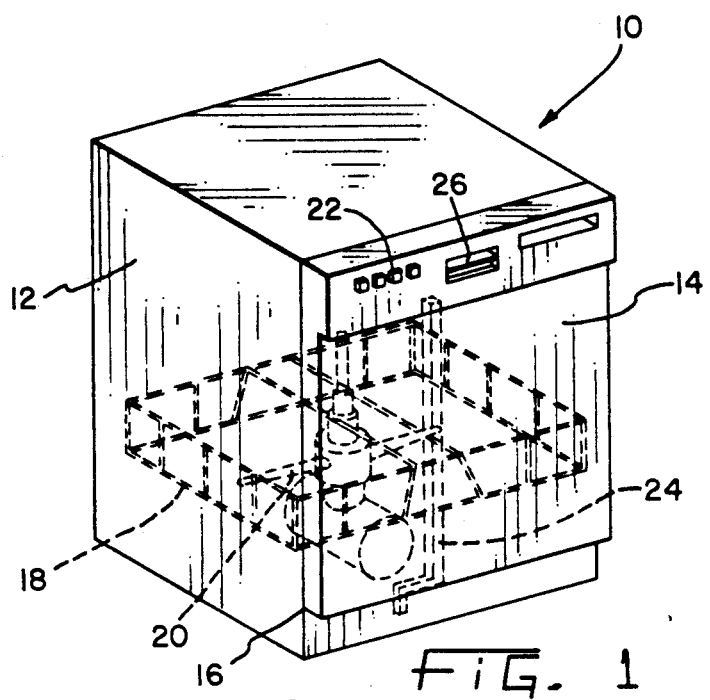
FIG. 1 is a perspective view of a dishwasher incorporating a preferred embodiment of the wire harness protector according to the present invention.

Referring to FIG. 1, there is shown a dishwasher 10 having a cabinet 12 and a door 14. The door is hollow and is hinged at its bottom 16 to cabinet 12 by means of a hinge (not shown). A dish rack 18, shown in dashed lines, is mounted in the cabinet for holding dishes to be washed. A revolving spray arm 20 is rotatably mounted in the dishwasher cabinet for spraying water on the dishes. Hollow door 14 has mounted therein electric controls 22 and a latch 26. A wire harness (not shown) connects the controls in the door to a source of electrical supply and to other electrical components which are mounted in the cabinet 12, such as an electric motor and a water inlet valve. A wire harness protector 24, shown in dashed lines, encloses the wire harness portion which is routed through the hollow door and past hinge 16.

Figure 10:
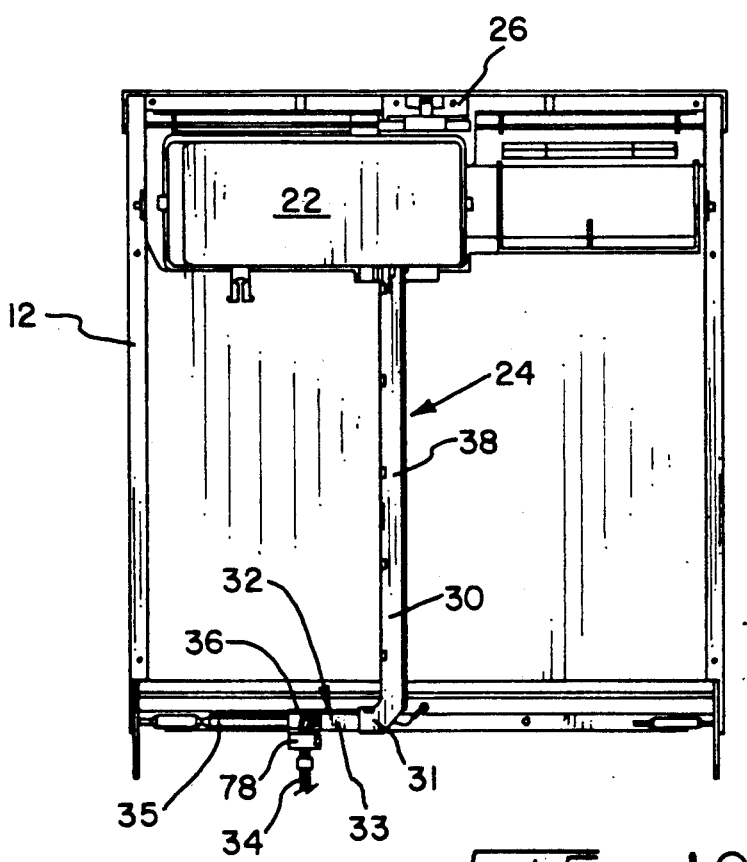
FIG. 10 is a front elevational view of a dishwasher with the front door panel removed and a wire harness protector according to the present invention installed therein.

By referring to FIG. 10, the interior of the door can be seen. FIG. 10 is a front elevational view of the dishwasher door with the front panel thereof removed so that the interior of the door is visible. Electrical controls 22 are shown as well as latch 26 and wire harness protector 24. Wire harness protector 24 consists of two parts: namely, a main body or first member 30 which is fixedly mounted in the door and pivots with the door and a second member 32 which is secured to the door such that, when the door is mounted to dishwasher cabinet 12, the second member is permitted to remain in a fixed position relative to the dishwasher cabinet. It can be seen that the main body 30 is L-shaped with the horizontal portion 31 thereof horizontally disposed and parallel to the door hinge 35. The second member 32 is also L-shaped and includes a horizontal portion 33 which is aligned with and forms a continuation of horizontal leg 31 of first member 30. As clearly seen in FIG. 10, the wire harness protector completely surrounds, encloses, and routes wire harness 34 through the door and routes wire harness 34 past hinge 35. Wire harness 34 is exposed only in a short portion of the horizontal leg 33 of second member 32 as shown at 36. It should be noted that while second member 32 is shown secured to the door at the hinge axis of the door, that the second member could also be attached to the stationary door support structure. However, the first and second members 30 and 32 should pivot with respect to each other when the door is pivoted.

Figure 2:
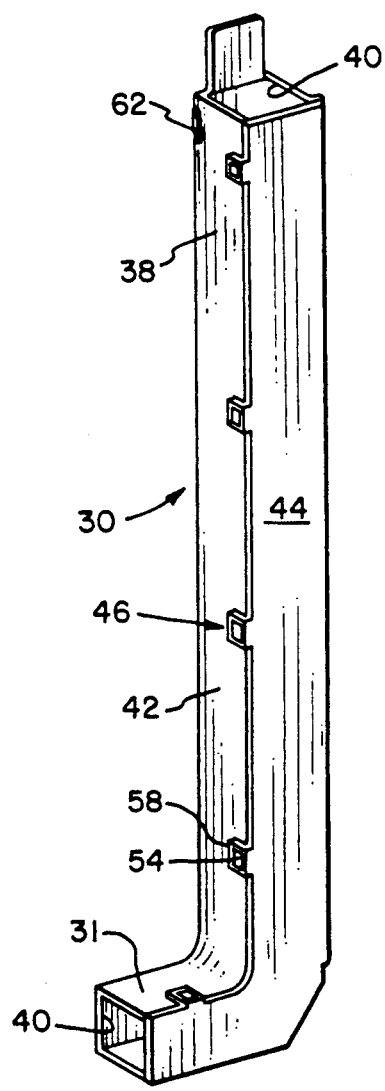
FIG. 2 is a perspective view of the first member of the wire harness protector according to the present invention for routing the wire harness through the door.
Figure 3:
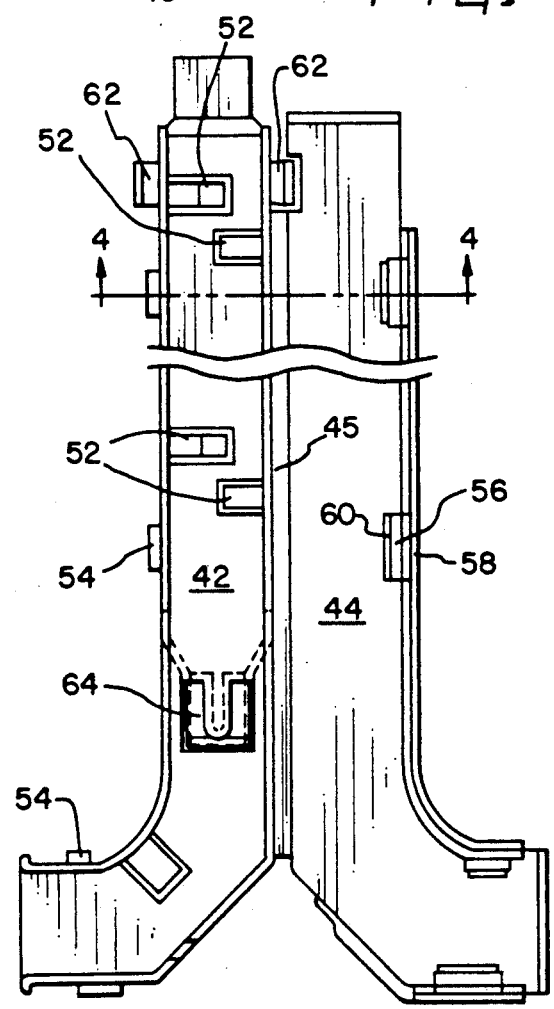
FIG. 3 is a top plan view of the member of FIG. 2 with its cover member in the open position.

Referring now to FIGS. 2-4, first member 30 is shown in greater detail. First member 30 forms an enclosure which is L-shaped and includes a vertical conduit portion 38 and a horizontal conduit portion 31. The enclosure defines an enclosed space 40 for enclosing and routing wire harness 34. The enclosure is formed by means of a U-shaped channel 42 and a cover 44 which is L-shaped in cross-section as clearly seen in FIG. 4. Cover 44 is connected to channel 42 by means of an elongated hinge 45. The entire first member 30 may be integrally molded from a plastic material such as, for instance, fire retardant polypropylene. This is a UL approved material for enclosing electrical wires in the dishwasher environment. Hinge 45 is sometimes referred to as a "living" hinge. After cover 44 is moved onto U-shaped channel 42 by pivoting about hinge 45, it is secured in place by means of snap locks 46. Snap locks 46 are spaced along the mating edges of the first member 30 as best shown in FIG. 2. Snap locks 46 consist of protrusions 54 which are captured in apertures 56. Stops 60 are provided for properly aligning and maintaining engagement of protrusions 54 with bridging portions 58. Fingers 52 are provided for retaining the wire harness within channel 42. Provision is made for attaching first member 30 to door 14 by means of lugs 62 and 64 which may be secured to the door.

Referring now to FIGS. 5, 6 and 10, the second member 32 of wire harness protector 24 is shown. Second member 32 also includes a U-shaped channel 70. A short cover 72 is secured to channel 70 with a living hinge 73 for partially closing channel 70. A portion 36 of channel 70 is open and not covered. The conduit which is formed by channel 70 and cover 72 forms a conduit 33 which is horizontally disposed and aligned with horizontal conduit 31 of first member 30 as best seen in FIG. 10. U-shaped channel 70 opens into U-shaped channel 74. Channel 74 is vertically arranged as shown in FIGS. 1 and 10. U-shaped channel 74 also has a cover 76 hinged thereto by means of a living hinge 77 to form a conduit 78 which is vertically disposed. Covers 72 and 76 are held in place by locking snaps 79 similarly to cover 44. Second member 32 may be secured to the door by means of an attachment lug 80 which includes a cavity 82 for receiving a pivot pin or the like.

In operation, the wire harness is arranged in the wire harness protector by opening covers 44, 72, and 76. The U-shaped channels 42, 70, and 74 are now open. Wire harness 34 can therefore be deposited in the U-shaped channels 42, 70, and 74 and held in place by means of fingers 52 of first member 30. Covers 44, 72 and 76 are locked in place by means of snap locks 46 and 79. Wire harness 34 is installed in the door by the securement of first member 30 to the door by means of lugs 62 and 64. Second member 32 is installed by means of attachment lug 80. Door 14 may now be pivoted and opened whereby the portion of the wire harness which is disposed in horizontal conduits 31 and 33 will twist torsionally rather than transaxially. The front panel of the door 14 may also be installed to cover wire harness protector 24 and the electrical components 22 inside the door.

Figure 8:
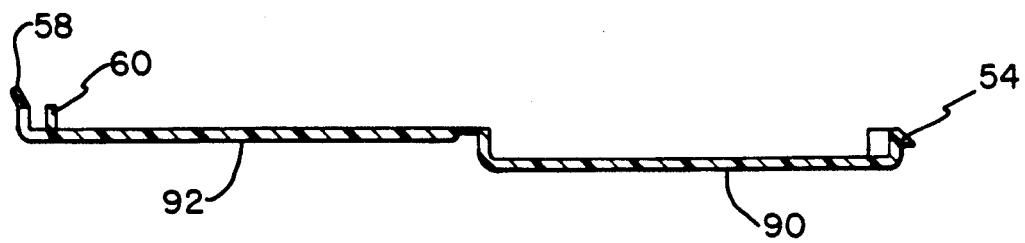
FIG. 8 is a cross sectional view of the member of FIG. 7 taken along line 8—8 thereof.
Figure 9:
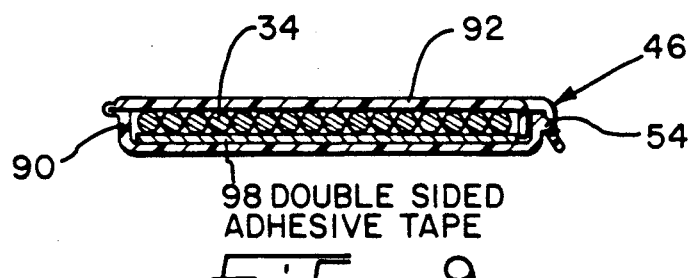
FIG. 9 is a cross sectional view of the member of FIG. 7 taken along line 8—8 thereof with a cover member thereof in the closed position and the wire harness installed therein.

In some arrangements, it may be desired to use a flat wire harness rather than a bundle of wires. This would permit, for instance, a thinner door for the appliance. For this arrangement, an alternative embodiment is shown in FIGS. 7, 8, and 9. As best seen in FIGS. 8 and 9, the cross-section of member 100, which corresponds to first member 30, is formed as a shallow U-shaped channel 90 and a cover 92. Similarly to the embodiment of FIGS. 2-4, locking snaps 46 are provided for locking cover 92 in place on U-shaped channel 90. Cover 92 is formed of two parts, 92A and 92B as best shown in FIG. 7. For the installation of a wire harness, a piece of double-backed tape 98 is used which is deposited flat in the bottom of U-shaped channel 90. Wire harness 34 is then installed onto the other side of the tape so that it will be held in place and secured. Similarly to the embodiment of FIGS. 2-4, member 100 may be held in place and secured inside the dishwasher door by means of lugs 102 and 104.

It will be apparent to those skilled in the art that the wire harness protector provides a first member connected to move with the door, and a second member connected to the door so as to remain stationary such that, when the door is connected to the door support structure, the second member becomes fixed relative to the support structure, and the first member pivots with the door.

It should be noted that the wire harness protector may be made of various types of materials, including plastic. Furthermore, it should be noted that the use of the wire harness protector is not limited to dishwashers but may be used in other appliances as well as in automobiles and the like.

What has therefore been provided is a very simple and effective arrangement for mounting a wire harness in the door of an appliance and for guiding the wire harness past the hinge of the door in such a way that only torsional forces will be placed on the wire harness as the door is pivoted into the open position.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims

What is claimed is:

1. For use in an appliance having a door support structure and a substantially hollow door pivotably mounted to said door support structure for pivoting about a hinge axis, a wire harness protector for enclosing and routing electrical wires from the door support structure through said hollow door, said wire harness protector comprising:

a first member including a first conduit, said first member adapted to be attached to said door with said first conduit arranged parallel to said hinge axis; and a second member adapted to be secured to said hollow door, said second member including a second conduit adapted to be disposed in substantial axial alignment with said first conduit for communication therewith when said second member is attached to said door, and a third conduit connected to said second conduit and communicating therewith, said third conduit being disposed at an angle to said second conduit.

2. The wire harness protector of claim 1 wherein said first member further includes a fourth conduit which communicates with said first conduit and which is disposed substantially perpendicularly to said first conduit.

3. The wire harness protector of claim 1 wherein said first and second members are formed of a thermoplastic material.

4. The wire harness protector of claim 1 wherein said second member further comprises an elongated channel portion, an elongated cover portion, and a hinge means for hingedly interconnecting said channel portion and said cover portion for forming therebetween said third conduit.

5. The wire harness protector of claim 4 further comprising securing means for securing said elongated channel portion in said door.

6. The wire harness protector of claim 4 wherein said second member is formed of a thermoplastic material and said hinge means comprises a web of said thermoplastic material integrally formed with and interconnecting said channel portion and said cover portion.

7. The wire harness protector of claim 1 wherein said second member includes a first channel portion, a first cover portion, and a first hinge means for hingedly interconnecting said first channel portion and first cover portion, whereby said first cover portion may be pivoted onto said first channel portion to form therebetween said third conduit.

8. The wire harness protector of claim 7 wherein said second member further comprises a second channel portion, a second cover portion, second hinge means for hingedly interconnecting said second channel portion and said second cover portion, whereby said second cover portion may be pivoted onto said second channel portion to form therebetween said second conduit.

9. The wire harness protector of claim 8 wherein said first channel portion is rigidly interconnected with said second channel portion.

10. The wire harness protector of claim 9 wherein said second member is formed of a thermoplastic material, said first hinge means comprises a web of said thermoplastic material integrally formed with and interconnecting said first channel portion and said first cover portion, and said second hinge means comprises a web of said thermoplastic material integrally formed with and interconnecting said second channel portion and said second cover portion.

11. The wire harness protector of claim 1 wherein at least one of said first, second and third conduits includes retaining means for retaining electrical wires in predetermined positions within said at least one conduit.

12. The wire harness protector of claim 11 wherein said retaining means further comprises means for retaining said electrical wires in a substantially flat array.

13. The wire harness protector of claim 11 wherein said retaining means comprises adhesive tape.

14. For use in a dishwasher, a wire harness protector for enclosing and routing electrical wires from a door support structure of a dishwasher through a hollow dishwasher door, said door pivotably mounted to said door support structure for pivoting about a hinge axis, said wire harness protector comprising:

a first member including an elongated first conduit formed therein, said first member adapted to be attached to said door with said first conduit disposed substantially parallel to said hinge axis; and a second member adapted to be secured in said door, said second member including a second conduit formed therein adapted to be disposed in substantial axial alignment with said first conduit for communication therewith when said second member is secured in said door, and a third conduit formed therein interconnected to said second conduit and communicating therewith, said third conduit being disposed substantially perpendicularly to said second conduit.

15. The wire harness protector of claim 14 wherein said first member further includes a fourth conduit formed therein which communicates with said first conduit and is disposed at an angle to said first conduit.

16. The wire harness protector of claim 14 wherein said first and second members are formed of a thermoplastic material.

17. The wire harness protector of claim 14 wherein said second member further comprises an elongated channel portion, an elongated cover portion, and an elongated hinge means hingedly interconnecting said elongated channel portion and said cover portion for forming therebetween said third conduit.

18. The wire harness protector of claim 17 further comprising securing means for securing said elongated channel portion in said door.

19. The wire harness protector of claim 17 wherein said second member is formed of a thermoplastic material and said elongated hinge means comprises a web of said thermoplastic material integrally formed with and interconnecting said channel portion and said cover portion.

20. The wire harness protector of claim 14 wherein said second member includes an elongated first channel portion, an elongated first cover portion, and a first hinge means for hingedly interconnecting said first channel portion and first said cover portion, whereby said first cover portion may be pivoted onto said first channel portion to form therebetween said third conduit.

21. The wire harness protector of claim 20 wherein said second member further comprises a second channel portion, a second cover portion, and a second hinge means for hingedly interconnecting said second channel portion and said second cover portion whereby said second cover portion may be pivoted onto said second channel portion to form said second conduit.

22. The wire harness protector of claim 21 wherein said second member is formed of a thermoplastic material, said first hinge means comprises a web of said thermoplastic material integrally formed with and interconnecting said first channel portion and said first cover portion, and said second hinge means comprises a web of thermoplastic material integrally formed with and interconnecting said second channel portion and said second cover portion.

23. The wire harness protector of claim 14 wherein at least one of said first, second, and third conduits includes a retaining means for retaining electrical wires in predetermined positions within said at least one conduit.

24. A pivotable door assembly for a dishwasher, said dishwasher having a door support structure, said door assembly being adapted to be pivotally mounted to said door support structure for pivoting movement about a hinge axis, said door assembly comprising:
   a door;
   a first wire harness member including an elongated first conduit formed therein, said first wire harness member secured to said door with said first conduit arranged substantially parallel to said hinge axis; and
   a second wire harness member secured to said door, said second wire harness member including a second conduit formed therein disposed in substantial axial alignment and communicating with said first conduit, and a third conduit formed therein communicating with said second conduit and disposed approximately perpendicularly to said second conduit.

25. The door assembly of claim 24 wherein said door is hollow and said first, second and third conduits form an elongated enclosure for completely enclosing at least a portion of a wire harness and for routing said at least a portion of said wire harness through said door.

26. The door assembly of claim 24 wherein at least one of said first and second wire harness members comprises an elongated channel portion, an elongated cover portion, and a hinge means for hingedly interconnecting said channel portion and said cover portion for forming therebetween at least one of said conduits.

27. The door assembly of claim 26 wherein said at least one of said wire harness members is formed of a thermoplastic material and said hinge means comprises a web of said thermoplastic material integrally formed with and interconnecting said channel portion and said cover portion.

28. The door assembly of claim 24 wherein said second wire harness member comprises:
   a channel portion;
   a first cover portion for covering said channel portion;
   a first hinge means for hingedly interconnecting said channel portion and said first cover portion to thereby form therebetween said third conduit;
   a second cover portion;
   a second hinge means for hingedly interconnecting said second cover portion and said channel portion to thereby form therebetween said second conduit.

29. The door assembly of claim 28 wherein said second wire harness member is formed of a first hinge means comprises a web of said thermoplastic material integrally formed with and interconnecting said channel portion and said first cover portion, and said second hinge means comprising a web of said thermoplastic material integrally formed with and interconnecting said channel portion and said second cover portion.

30. The door assembly of claim 2 wherein at least one of said first, second, and third conduits includes securing means for securing wires in predetermined positions within said at least one conduit in a parallel array which is coplanar with said door.

* * * * *